3,312,638
CELLULAR POLYURETHANES PREPARED USING THE REACTION PRODUCT OF A PHOSPHORIC ACID WITH AN ALKANOL AMINE

Wulf von Bonin, Schildgen, Rhineland, Hans Holtschmidt, Cologne-Stammheim, and Helmut Piechota, Leverkusen-Mathildenhof, Germany, assignors to Farbenfabriken Bayer Aktiengesellschaft, Leverkusen, Germany, a German corporation
No Drawing. Filed May 14, 1963, Ser. No. 280,420
Claims priority, application Germany, May 16, 1962, F 36,818
9 Claims. (Cl. 260—2.5)

This invention relates to polyurethane plastics and more particularly to polyurethane plastics which preferably have a porous structure and which are suitable for use as insulation and other structural materials.

The production of polyurethane plastics has been known for a long time. It is possible to prepare both porous and nonporous polyurethanes by the well known isocyanate polyaddition process from compounds having several active hydrogen containing groups as determined by the Zerewitinoff method and organic polyisocyanates. If desired, especially for the production of cellular polyurethane plastics, the reaction is carried out in the presence of water, activators, emulsifiers and other additives such as disclosed, for example, in Angewandte Chemie, vol. 59, page 257 (1948). By a suitable choice of components, it is possible to produce either rigid or flexible cellular polyurethane plastics.

Moreover, especially for the preparation of rigid cellular polyurethane plastics, it is often desirable to include monocarboxylic acids such as tall oil or brominated tall oil in the reaction mixture. When one includes such materials, the resulting polyurethane plastics often have unsatisfactory hot bending strength values or in other words their heat distortion point is unsatisfactory.

It is therefore an object of this invention to provide polyurethane plastics which have improved physical properties and particularly improved hot bending strength. Still another object of this invention is to provide cellular polyurethane plastics based on phosphorous containing polyols which have improved heat distortion points. Another object of this invention is to provide an improved process for the preparation of cellular polyurethane plastics based on organic polyisocyanates and phosphorous containing polymers. Another object of this invention is to provide substantially rigid cellular polyurethane plastics based on phosphorous containing polyols and monocarboxylic acids reacted together with organic polyisocyanates which have synergistically improved flame resistance and hot bending strength.

The foregoing objects and others which will become apparent from the following description are accomplished in accordance with the invention, generally speaking, by providing polyurethane plastics prepared by reacting an organic polyisocyanate with a compound containing active hydrogen containing groups which has been prepared by reacting a phosphoric acid with an alkanol amine. In accordance with a preferred embodiment, a blowing agent is included in the reaction mixture so that a cellular polyurethane plastic results.

The reaction product of the phosphoric acid with the alkanol amine consists mainly of mixtures of mono-basic, di-basic and tri-basic alkanol amine salts. It is not clear whether water is split off or whether condensation reactions occur during dehydration of the reaction products. The most favorable compositions of the invention are the reaction products of phosphoric acid with an alkanol amine which has a pH-value between about 5 and about 10, although the use of reaction products with a pH-value outside this range is also possible. Any suitable method of reacting the phosphoric acid with the alkanol amine may be used and the reaction is generally effected by simply mixing the alkanol amine with the phosphoric acid, preferably with cooling. In order to remove the water in the reaction mixture which is usually present because of the water contained in the starting materials the reaction product is preferably heated for a short time to a temperature of up to about 100° C. or slightly above at a reduced pressure to remove undesirable volatile components and water. It is preferred to react the alkanol amine with the phosphoric acid at a temperature below about 150° C. and most preferably below about 90° C. The ratio of phosphoric acid to alkanol amine is preferably approximately stoichiometric so that substantial neutralization occurs but the reaction does not have to be stoichiometric and the reaction product may therefore be either acid or alkaline. It is preferable, as set forth above, that the pH-value of an aqueous solution fall within the range of from about 5 to about 10.

Any suitable alkanol amine may be used including primary, secondary or tertiary, mono or polyamines. Thus, basic examples are monoethanol amine, diethanol amine and triethanol amine. The reaction products of ethoxylated or propoxylated amines with phosphoric acids are preferred but other alkoxylated amines including those prepared with 1,2-butylene oxide and the like may also be used. The preferred alkanol amines are those which contain only secondary and/or tertiary amino groups such as diethanol amine, diisopropanol amine, N-methyl-ethanol amine, N-methyl-diethanolamine, N,N-diethyl-ethanolamine and the like. Other amines include triisopropanolamine, dimethyl - 1,3 - aminopropanol, methyloleyl-ethanolamine, N,N-dihydroxyethylaniline, N,N,N',N'-tetrakis(beta-hydroxy propyl)ethylene diamine and N, N,N',N'-tetrakis(beta-hydroxy ethyl ethylene diamine as well as amines, the amine hydrogen atoms of which are wholly or partially substituted by polyalkylene oxides with terminal —OH groups (these compounds can be prepared by further alkoxylation of the alkanolamines), such as

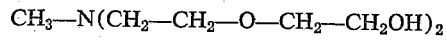

or compounds of the type

(in which R is hydrogen or an alkyl, aryl or alkoxy radical, A is R or B, B is a polyalkoxy radical with terminal OH-group). The alkanolamines can be used in pure form or admixed with one another. Thus R in the formula when it is an alkyl is preferably a lower alkyl radical having 1 to 10 carbon atoms such as methyl, ethyl, propyl, butyl, hexyl, decyl and the like; or aryl, preferably having one benzene ring such as phenyl; or an alkoxy radical such as ethoxy, propoxy, butoxy, hexoxy or the like, which preferably has 1 to 6 carbon atoms. B in the foregoing formula may be any suitable polyalkoxy radical with terminal or free-Oh groups such as polyethylene oxide, polypropylene oxide, polybutylene oxide or the like preferably having a molecular weight of 400, 600 and 800 respectively per chain and each having a free hydroxyl group. In order to vary the solubility properties of the reaction products they may be subsequently alkoxylated by reaction of the free hydroxyl groups with, for example, ethylene oxide, propylene oxide, butylene oxide, styrene oxide, epichlorohydrin, tetrahydrofuran or the like.

Any suitable phosphoric acid may be used including ortho, meta and pyro phosphoric acid, partially esterfied phosphoric acids and mixtures thereof. It is preferred to use phosphoric acid which corresponds to a mixture of from about 5 to about 35 percent by weight of water and the balance $P_2O_5$. Orthophosphoric acid is particularly preferred.

The foam materials are produced in a manner known per se, using conventional starting materials. According to the invention, the foaming takes place in the presence of the previously described reaction products of alkanolamine and phosphoric acids. Small quantities of the reaction products, for example 1 to 10 percent, based on the reaction mixture to be foamed, are preferred. Nevertheless, larger quantities of reaction products can also be used if desired.

Compounds containing active hydrogen containing groups as determined by the Zerewitinoff method and preferably hydroxyl and/or carboxyl groups are suitable as compounds having reactive hydrogen atoms for the production of the foam material. Linear or branched polyesters or polyester amides prepared by known methods from monofunctional or polyfunctional alcohols such as ethanol, ethylene glycol, propylene glycol, trimethylol propane, glycerine, pentaerythritol and the like; and polycarboxylic acids or hydrocarboxylic acids, such as adipic acid, phthalic acid, rincinoleic acid and the like, if desired with the co-use of amino-alcohols, such as ethanol amine, diamines, such as ethylene diamine, hydroxyamines, such as diethanol amine or amino carboxylic acids such as alanine and the like may be mentioned as examples of suitable compounds. These polyesters or polyester amides may contain hetero-atoms such as oxygen or sulphur, double bonds and triple bonds as well as modifying radicals derived from unsaturated or saturated fatty acids such as oleic acid, or fatty acid alcohols such as lauryl alcohol. Linear polyalkylene glycol ethers of various molecular weights, obtained by polymerizing alkylene oxides, such as ethylene oxide, 1,2-propylene oxide, butylene-1,2-oxide, butylene-2,3-oxide, styrene oxide, epichlorohydrin, tetrahydrofuran and the like may also be mentioned, in particular those with a hydroxyl group content of 0.5 to 15%. Copolymers can also be used. The properties of the final products are often modified to an appreciable degree by the addition thereof.

Linear or branched polyethers obtained by addition of the said alkylene oxides to, for example polyfunctional alcohols, amino alcohols or amines, are also suitable. Polyfunctional components include ethylene glycol, propylene-1,2-glycol, trimethylopropane, butane-1,2,4-triol, glycerine, castor oil, ethanolamine, diethanolamine, triethanolamine, aniline, alkylene diamines of the type of ethylene diamine, tetramethylene diamine and hexamethylene diamine. It is obvious that mixtures of linear or branched alkylene glycol ethers of different types can also be employed.

These polyalkylene glycol ethers can also be used in admixture with other polyvalent hydroxyl compounds, for example, in admixture with butylene-1,4-glycol, trimethylol-propane, pentaerythritol, tartaric acid esters, castor oil, polyphosphates prepared by transesterifying a trialkyl phosphite such as tri-beta-chloroethyl phosphite with a polyhydric alcohol such as triethylene glycol and the like. Foaming with the polyalkylene glycol ethers can also be effected in admixture with polyesters.

Polythioethers, phenols reacted with alkylene oxide, formaldehyde resins, hydrogenation products of ethyleneolefine-carbon monoxide copolymers and epoxy resins are also to be mentioned as examples of suitable polyhydroxyl compounds.

It is possible to use saturated and/or unsaturated carboxylic acids in basically the same manner, such as those which occur for example in naturally existing products or which can be obtained from the latter. Examples include tall oil, cotton oil fatty acid, ground nut fatty acid, coconut oil fatty acid, palm kernel oil fatty acid, palm oil fatty acid, rape oil fatty acid, soya oil fatty acid, tallow oil fatty acid, sperm oil fatty acid, train oil fatty acid and hydrogenation products thereof. Halogenated derivatives of the aforementioned carboxyl compounds can also be used, the flame protection of the resultant foam materials being improved by synergistic action. Thus, chlorinated or brominated derivatives and preferably brominated or chlorinated tall oil may be used. The carboxyl compounds can of course also be used in admixture with one of the aforesaid polyesters or polyethers.

In order to increase the flame resistance by synergistic action mixtures of the phosphoric acid-alkanolamine, reaction products with polyhydroxyl compounds containing phosphorous atoms, for example according to German specification 1,106,489 may be used.

Any suitable organic polyisocyanates may be used including n-butylene diisocyanate, hexamethylene diisocyanate, m-xylylene diisocyanate, p-xylylene diisocyanate, 4,4-dimethyl-1,3-xylylene diisocyanate, cyclohexane-1,4-diisocyanate, dicyclohexylmethane-4,4'-diisocyanate, m-phenylene diisocyanate, p-phenylene diisocyanate, 1-alkylbenzene-2,4-diisocyanates, such as 2,4-toluylene diisocyanate, 3-(alpha-isocyanatoethyl)-phenylisocyanate, 1-alkylbenzene-2,6-diisocyanates, such as 2,6-toluylene diisocyanate, 2,6-diethylbenzene-1,4-diisocyanate, diphenylmethane-4,4'-diisocyanate, diphenyldimethyl-methane-4,4'-diisocyanate, 3,3'-dimethoxy-diphenylmethane-4,4'-diisocyanate and naphthylene-1,5-diisocyanate; trifunctional and polyfunctional polyisocyanates can also be used, for example toluene-2,4,6-triisocyanate as well as reaction products of for example 1 mol of a trihydric alcohol with 3 mols of a diisocyanate and those polyisocyanates which are used for example according to German patents 1,022,789 and 1,027,394.

It is often desirable to use a polyaryl polyalkylene polyisocyanate, or in other words, a crude mixture of polyisocyanates and the by-products of their manufacture.

Any suitable crude isocyanate may be used such as, for example, crude toluylene diisocyanate obtained by the phosgenation of a mixture of toluylene diamines or crude diphenyl methane isocyanates obtained by the phosgenation of crude diphenyl methane diamine. Crude diphenyl methane diamine is the reaction product of aniline and formaldehyde in the presence of HCl and contains some tri- and higher polyamines. A preferred unrefined or crude isocyanate is one having from about 26 to about 33 percent free —NCO and an amine equivalent of about 120 to about 150, such as, for example, a product having about 32 percent free —NCO and an amine equivalent of about 140. A specified crude isocyanate suitable for use in accordance with the present invention may be obtained by reacting about 60 parts of aniline with about 25 parts of formaldehyde (37 percent aqueous) and about 74 parts of HCl (30 percent aqueous) at a temperature of about 90° C. to about 100° C. for about 1.5 to about 2 hours and then reacting this product with NaOH and separating out the crude amine. About 100 parts of phosgene are then reacted with the crude amine until a product having an amine equivalent of about 135 and containing about 31 percent free —NCO is obtained. The free excess phosgene and substantially all of the solvents used, if any, are then removed. When toluylene diisocyanates, for example, are produced by conventional phosgenation of the corresponding diamines, a product containing about 90 percent 2,4- and 2,6-toluylene diisocyanate and the balance a crude residue of imidazoles and the like resulting in the phosgenation is obtained from the phosgenator. This product may also be used. It is preferred to phosgenate a mixture of ortho- and para-toluylene diamines. A specific product is the undistilled reaction mixture obtained by the phosgenation of 80 percent 2,4- and 20 percent 2,6-toluylene diamine containing 90 percent of a mixture of about 80 percent 2,4- and 20 percent 2,6-toluylene diisocyanate and the balance polymers incapable of accurate analysis.

The commercially available crude 4,4'-diphenyl methane diisocyanate having an assay of about 90 percent maximum, an amine equivalent of 141 maximum, about 0.04 to about 0.4 percent by weight hydrolyzable chloride, about 0.1 to about 0.6 percent by weight total chloride and having a flash point of about 430° F. may be used. As pointed out above, when toluylene diisocyanate, for example, is produced by conventional phosgenation of the corresponding diamine, a product containing about 90 percent 2,4- and 2,6-toluylene diisocyanate is obtained from the phosgenator. Of course, the product from the phosgenator is subjected to distillation to remove the solvent so that a product having 90 percent 2,4- and 2,6-toluylene diisocyanate is obtained. The initial product from the phosgenator in most cases contains about 80 percent by weight of solvent. The 2,4- and 2,6-toluylene diisocyanate may be mixed with any suitable amount of the residue obtained if the isocyanate is refined and then reconstituted. In this event, it is preferred to have at least 50 percent of the refined isocyanate present. The crude polyisocyanate disclosed in U.S. Patent 2,950,307 is suitable.

Any suitable catalysts, emulsifiers or blowing agents may be used. Mention may be made for example of tertiary amines such as hexahydrodimethylaniline, triethylamine, N-ethyl-morpholine, N-methyl-N'-dimethyl-aminoethylpiperazine, triethylene diamine, permethylated diethylene triamine, bis-aminoethanoladipate, tin salts of carboxylic acids such as stannous octoate, dibutyl tin dilaurate, stannous oleate, iron acetylacetonate and 1-azabicycloheptane and the like. In addition to water one may use halohydrocarbons including trichlorofluoromethane, dichlorodifluoromethane or the like as blowing agents. It is preferred to use a foam stabilizer for the production of the cellular polyurethane plastics such as, for example, sulphonated castor oils and sodium salts thereof. Where polyhydric polyalkylene ethers are included in the reaction mixture to prepare a cellular polyurethane plastic, it is preferred to employ a silicone oil such as that disclosed in U.S. Patent 2,834,748 within the scope of the formula

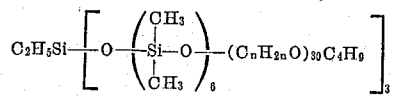

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula:

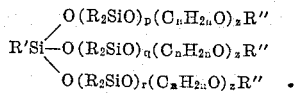

wherein $(C_nH_{2n}O)$ is a mixed polyoxyethylene and oxypropylene block copolymer containing about 17 oxyethylene units and about 13 oxypropylene units.

The particular advantage of the process according to the invention is that high hot bending strength values are imparted to the hard foam material by the use according to the invention of even relatively small quantities of reaction products of phosphoric acids and alkanol amines during the production of said materials. For example, if a foam material is prepared from the following components in Recipe I:

60.0 parts by weight of the reaction product of 1 mol of phosphoric acid and 5 mols of propylene oxide
20.0 parts by weight of N,N,N',N'-tetrakis(beta-hydroxy propyl) ethylene diamine
20.0 parts by weight of polyester obtained from 1 mol of adipic acid, 2.6 mols of phthalic acid, 1.3 mols of oleic acid and 6.9 mols of trimethylol propane (—OH number 380).
1.0 part by weight of N-methyl-N'-(N,N-dimethylaminoethyl)-piperazine 1.0 part by weight of silicone oil having the formula

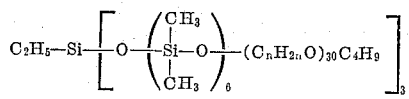

wherein $(C_nH_{2n}O)$ is a mixed polyoxyethylene and oxypropylene block copolymer containing about 17 oxyethylene units and about 13 oxypropylene units
0.1 part by weight of dibutyl-tin-dilaurate
6.0 parts by weight of sodium-castor oil sulphonate (about 50 percent water content)
171.0 parts by weight of the crude reaction product obtained by phosgenating the reaction product of aniline with formaldehyde under acid conditions, the resulting crude mixture of organic polyisocyanates having an amine equivalent of about 141 and containing about 50 percent diisocyanates, the balance being higher polyisocyanates, this foam material has the hot bending strength given below under Recipe I.

If 10 parts by weight of the polyester in the aforementioned recipe are replaced by 10 parts by weight of the reaction product of orthophosphoric acid and diethanolamine, the resulting foamed material has the hot bending strength shown below under Recipe II.

° C.
Recipe I: Hot bending strength _____ 141
Recipe II: Hot bending strength _____ 188

The increase in the hot bending strength is particularly pronounced with the foaming using carboxyl compounds. For example, if a foam material is prepared from Recipe III:

70.0 parts by weight of brominated tall oil (about 27 percent by weight bromine, and containing about 12 percent rosin acids, about 58 percent fatty acids and the balance unsaponifiables)
30.0 parts by weight of polyester of Recipe I obtained from adipic acid, phthalic acid, oleic acid and trimethylol propane
2.0 parts by weight of N-methyl-N'-(N,N-dimethylaminoethyl)-piperazine.
0.1 part by weight of dibutyl-tin dilaurate
2.0 parts by weight of permethylated diethylene triamine
1.0 part by weight of the silicone oil used in Recipe I
6.0 parts by weight of sodium-castor oil sulphonate (50 percent water content)
96.0 parts by weight of the crude polyisocyanate mixture of Recipe I, this foam material has the hot bending strength shown below under Recipe III. If the polyester is replaced by 30 parts by weight of a reaction product of orthophosphoric acid and diethanolamine, and the quantity of isocyanate is increased stoichiometrically to 139 parts by weight, the result is a foam material with the hot bending strength shown under Recipe IV.

° C.
Recipe III: Hot bending strength _____ 100
Recipe IV: Hot bending strength _____ 165

It is also possible to prepare other polyurethanes, including elastomers by the method of U.S. Patent 2,729,618 and coatings, by the method of the invention. The coatings are prepared by mixing the polyisocyanate with the polyols in an inert organic solvent such as benzene, xylene, ethylene glycol diacetate or the like.

The cellular polyurethanes of the invention are useful for the preparation of both sound and thermal insulations as in ceiling or wall tile and the like. Elastomers may be used as gear wheels. Coatings are useful on wood, metal or the like.

The invention is further illustrated by the following examples in which the parts are by weight unless otherwise indicated.

*Starting material I.*—Diethanolamine is heated to about 190° C./12 mm. Hg, until pure diethanolamine distills over as distillate at about 145° C. About 2788 parts of the material dehydrated in this manner are mixed slowly with about 1775 parts of 90 percent orthophosphoric acid with stirring at such a rate that the reaction temperature does not rise above about 105° C. The reaction mixture is then distilled at about 12 mm. Hg until the distillate passing over has a boiling point of about 100° C. Dehydration is then stopped. A syrup with a very low tendency to crystallization is left. The aqueous solution has a pH-value of about 6.5 (measured with normal commercial "Lyphan" paper). Analysis yields the following values: $H_2O$ (according to Fischer), 0.4 percent; C, 27.4 percent; H, 7.5 percent; P, 12.5 percent.

Example 1

About 70.0 parts of brominated tall oil of Recipe III, about 30.0 parts of starting material I, about 3.0 parts of N - methyl-N'-(N,N-dimethylaminoethyl)-piperazine, about 2.0 parts of dibutyl-tin-dilaurate, about 1.0 part of silicone oil of Recipe I, about 6.0 parts of sodium-castor oil sulphonate (50 percent water content), and 139 parts of the crude polyisocyanate mixture of Recipe I, are combined together and thoroughly mixed. After pouring into a mold, a flame-resistant foam material is formed which has a density of about 40 kg./m.$^3$ and a hot bending strength of about 165° C.

*Starting material II.*—Triethanolamine is dehydrated in a manner similar to starting material I. About 740 parts of the dehydrated material are mixed with about 210 parts of 88.6 percent orthophosphoric acid and the reaction mixture is distilled at about 12 mm. Hg until about 35 parts of distillate have passed over. A brown viscous material is left and the aqueous solution thereof, measured in a manner analogous to starting material I, has a pH-value of about 8.

Example 2

About 90.0 parts of polyester of Recipe I obtained from adipic acid, phthalic acid, oleic acid and trimethylol propane, about 10.0 parts of starting material II, about 1.0 part of N-methyl-N'-(N,N-dimethylaminoethyl) piperazine, about 0.1 part of permethylated diethylene triamine, about 1.0 part of dibutyl-tin-dilaurate, about 1.0 part of the silicone oil of Recipe I, about 6.0 parts of sodium-castor oil sulphonate, about 50 percent water content), and 153.0 parts of the crude polyisocyanate mixture of Recipe I, are thoroughly mixed together and, after being poured into a mold, produce a foam material having a density of about 55 kg./m.$^3$ and a hot bending strength of about 165° C.

*Starting material III.*—About 666 parts of an approximately 80 percent aqueous solution of N,N-dimethylethanolamine and about 432 parts of 88.6 percent orthophosphoric acid are mixed and a two-phase system is formed, the lighter phase of which is discarded. From the other phase, 25 parts are distilled off at a hot bath temperature of about 145° C. and at about 15 mm. Hg. A light-colored syrup is left, the aqueous solution of which, when measured in a manner analogous to starting material I has a pH-value of about 6.5.

Example 3

About 90.0 parts of the addition product of propylene oxide and trimethylol propane (OH number 380), about 10.0 parts of starting material III, about 1.0 part by weight of N-methyl-N'-(N,N-dimethylaminoethyl)-piperazine, about 1.0 part of permethylated diethylene-triamine, about 0.1 part of dibutyl-tin-dilaurate, about 1.0 part of the silicone oil of Recipe I, about 6.0 parts of sodium-castor oil sulphonate (about 50% water content), and about 137 parts of the crude polyisocyanate mixture of Recipe I diisocyanate, are quickly stirred together, and after being cast into a mold, produce a foam material with a density of about 40 kg./cm.$^3$ and a hot bending strength of about 137° C.

*Starting material IV.*—About 561 parts of 99 percent N-methylethanolamine are stirred with about 294 parts of crystallized orthophosphoric acid. About 300 parts of distillate are then extracted at a hot bath temperature of about 175° C. and about 12 mm. Hg. A light-yellow viscous material is left, the aqueous solution of which, measure in a manner analogous to starting material I, and has a pH-value of about 5.

Example 4

About 60 parts of propoxylated phosphoric acid used in Recipe I, about 20 parts of N,N,N',N'-tetrakis (beta-hydroxypropyl) ethylene diamine, about 10.0 parts of propoxylated trimethylol propane of Example 3, about 10.0 parts of starting material IV, about 2.0 parts of N-methyl - N'-(N,N-dimethylaminoethyl)-piperazine, about 1.0 part of permethylated diethylene triamine, about 0.2 part of dibutyl-tin-dilaurate, about 1.0 part of the silicone oil of Recipe I, about 6.0 parts of sodium-castor oil sulphonate (about 50 percent water content), and about 156 parts of the crude polyisocyanate mixture of Recipe I, are thoroughly mixed together and poured into a mold. A foam material is obtained which has a density of about 37 kg./m.$^3$ and a hot bending strength of about 142° C.

*Starting material V.*—About 888 parts of N,N-dihydroxyethyl-oleylamine are mixed with about 111 parts of 88.6 percent $H_3PO_4$, and about 22 parts of distillate are then driven off at a bath temperature of about 175° C. and about 12 mm. Hg. A reddish-brown syrup is left, the aqueous solution of which, measured according to starting material I, has a pH-value of about 7.

Example 5

About 70.0 parts of crude tall oil having the following analysis: 28.7 percent resin acids, 55 percent fatty acids, balance unsaponifiable with an acid number of about 122, about 20.0 parts of polyester of Recipe I of adipic acid, phthalic acid, oleic acid and trimethylol propane, about 10.0 parts of starting material V, about 3.0 parts of N-methyl-N'-(N,N-dimethyl amino ethyl)-piperazine, about 2.0 parts of permethylated diethylene triamine, about 0.2 part of dibutyl-tin-dilaurate, about 1.0 part of the silicone oil of Recipe I, about 6.0 parts of sodium-castor oil sulphonate (about 50 percent water content), and about 99.0 parts of the crude polyisocyanate mixture of Recipe I, are thoroughly mixed together. After pouring into a mold a foam material is formed which has a density of about 35 kg./m.$^3$ and a hot bending strength of 124° C.

*Starting material VI.*—About 175 parts of crystalline $H_2PO_4$ are slowly added with stirring to about 300 parts of diisopropanol amine at such a rate that the temperature does not rise above about 90° C. A light-yellow highly viscous substance if formed, the aqueous solution of which, measured according to starting material I, has a pH-value of about 6.5.

Example 6

About 60.0 parts of polyester obtained by transesterification from tris-(β-chloroethyl)-phosphite and triethylene glycol (OH number 250) about 20.0 parts of N,N,N',N'-tetrakis(β-hydroxy propyl) ethylene diamine, about 10.0 parts of polyester of Recipe I obtained from adipic acid, phthalic acid, oleic acid and trimethylol propane, about 10.0 parts of starting material VI, about 0.5 part of N-methyl-N'-(N,N - dimethylaminoethyl) - piperazine, about 0.5 part of permethylated diethylene triamine, about 0.2 part of dibutyl-tin-dilaurate, about 1.0 part of the silicone oil of Recipe I, about 6 parts of sodium-castor oil sulphonate (about 50% water content), and 152.0 parts of the crude polyisocyanate mixture of Recipe I, are quickly and thoroughly mixed together. After pouring into a mold, a foam material is obtained which has a density of about 41 kg./m.$^3$ and a hot bending strength of about 121° C.

The foregoing working examples are given for the purpose of illustration and if the teachings of this disclosure are followed any other suitable organic polyisocyanate, polyol, alkanol amine, stabilizer, phosphoric acid or the like could have been used therein.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A cellular polyurethane plastic prepared by a process which comprises reacting, in the presence of a blowing agent, an organic polyisocyanate with a compound containing active hydrogen containing groups as determined by the Zerewitinoff method, said compound containing active hydrogen containing groups having a pH value between about 5 and about 10 and having been prepared by a process which comprises reacting a phosphoric acid corresponding to a mixture of from about 5 to about 35 percent by weight of water and the balance $P_2O_5$ with an alkanol amine at a temperature below about 150° C., said phosphoric acid and said alkanol amine being present in approximately stoichiometric amounts.

2. The cellular polyurethane plastic of claim 1 wherein said blowing agent is a halohydrocarbon.

3. The cellular polyurethane plastic of claim 1 wherein said blowing agent is trichlorofluoromethane.

4. The cellular polyurethane plastic of claim 1 wherein a monocarboxylic acid is included in the reaction mixture.

5. The cellular polyurethane plastic of claim 1 wherein tall oil is included in the reaction mixture.

6. The cellular polyurethane plastic of claim 1 wherein halogenated tall oil is included in the reaction mixture.

7. The cellular polyurethane plastic of claim 1 wherein brominated tall oil is included in the reaction mixture.

8. The cellular polyurethane plastic of claim 1 wherein said alkanol amine is diethanolamine.

9. The cellular polyurethane plastic of claim 1 wherein said compound containing active hydrogen containing groups as determined by the Zerewitinoff method is mixed with up to about 90 percent by weight of an organic compound containing active hydrogen containing groups as determined by the Zerewitinoff method which is free from phosphorus.

References Cited by the Examiner

UNITED STATES PATENTS

| | | | |
|---|---|---|---|
| 2,656,372 | 10/1953 | Ernst et al. | 260—924 |
| 3,002,928 | 10/1961 | Zajac | 260—924 |
| 3,030,340 | 4/1962 | McConnell et al. | 260—77.5 |
| 3,095,386 | 6/1963 | Hudson | 260—75 |
| 3,097,191 | 7/1963 | France et al. | 260—2.5 |
| 3,134,742 | 5/1964 | Wismer et al. | 260—75 |
| 3,151,137 | 9/1964 | Young et al. | 260—924 |
| 3,215,828 | 5/1966 | Lutz | 260—2.5 |

LEON J. BERCOVITZ, *Primary Examiner.*

DONALD CZAJA, J. J. KLOCKO, G. W. RAUCHFUSS, *Assistant Examiners.*